US005397044A

United States Patent [19]

Suzuki

[11] Patent Number: 5,397,044

[45] Date of Patent: Mar. 14, 1995

[54] PAPER WEB THREADING APPARATUS FOR PAPER WEB HANDLING MACHINE

[75] Inventor: Kunio Suzuki, Kanagawa, Japan

[73] Assignee: Kabushiki Kaisha Tokyo Kikai Seisakusho, Tokyo, Japan

[21] Appl. No.: 96,828

[22] Filed: Jul. 26, 1993

Related U.S. Application Data

[63] Continuation of Ser. No. 750,039, Aug. 19, 1991, abandoned.

[30] Foreign Application Priority Data

Aug. 28, 1990 [JP] Japan .................................. 2-224210

[51] Int. Cl.$^{6}$ .......................... G03B 1/56; B41F 13/54

[52] U.S. Cl. ........................................ 226/92; 101/228

[58] Field of Search ...................... 101/228; 226/91, 92

[56] References Cited

U.S. PATENT DOCUMENTS

| | | | |
|---|---|---|---|
| 2,944,345 | 7/1960 | Faeber | 34/56 |
| 3,127,079 | 3/1964 | Allander | 226/92 |
| 3,587,461 | 6/1971 | Polglase | 101/228 X |
| 3,761,001 | 9/1973 | Bolza-Schunemann et al. | 226/92 |
| 3,795,551 | 12/1976 | Mitter | 101/228 X |
| 3,995,553 | 12/1976 | Winterholler et al. | 101/228 |
| 4,063,505 | 12/1977 | Sasamoto et al. | 226/91 X |
| 4,065,042 | 12/1977 | Zielinski | 226/92 |
| 4,111,122 | 9/1978 | Kutzner et al. | 101/228 |
| 4,370,927 | 1/1983 | Fischer | 101/228 |
| 4,480,801 | 11/1984 | Stone | 101/228 X |
| 4,676,445 | 6/1987 | Itikawa | 226/91 X |
| 4,706,862 | 11/1987 | Theilacker | 226/92 |
| 4,747,254 | 5/1988 | Lancaster | 226/92 X |
| 4,750,659 | 6/1988 | Maier et al. | 226/92 |
| 4,815,220 | 3/1989 | Wedel | 34/120 |
| 4,831,926 | 5/1989 | Bowman et al. | 101/138 |
| 4,904,344 | 2/1990 | Peiffer | 162/193 |
| 5,052,295 | 10/1991 | Suzuki et al. | 226/92 X |

FOREIGN PATENT DOCUMENTS

| | | |
|---|---|---|
| 61-167553 | 7/1986 | Japan . |
| 62-925 | 1/1987 | Japan . |
| 63-163939 | 10/1988 | Japan . |
| 2-29727 | 2/1990 | Japan . |
| 2-86249 | 3/1990 | Japan . |

OTHER PUBLICATIONS

Japanese Patent Abstract No. 61-167553, Jul. 29, 1986 "Automatic Paper Passing Apparatus".

*Primary Examiner*—Stodola: Daniel P.
*Assistant Examiner*—Michael R. Mansen
*Attorney, Agent, or Firm*—Armstrong, Westerman, Hattori, Mcleland & Naughton

[57] ABSTRACT

A paper web threading apparatus for use in a paper web handling machine includes a paper web threading member movably disposed substantially along a paper web threading path; a driver for driving the paper web threading member; a first signal generator for outputting a signal in response to the movement of the paper web threading member; a processor for receiving the signal outputted by the first signal generator as an input thereof, processing the signal so as to obtain a processed value relating to the speed of movement of the paper web threading member, and comparing the processed value with a reference value preset in connection with the operating speed of the paper web handling machine when the paper web is threaded along its paper web threading path, and then outputting an adjusting signal depending on the result of comparison; and an adjusting device for receiving the adjusting signal outputted by the processor as an input thereof and adjusting the driver so as to vary the speed of movement of the paper web threading member.

9 Claims, 2 Drawing Sheets

PAPER WEB THREADING APPARATUS FOR PAPER WEB HANDLING MACHINE

This application is a continuation of application Ser. No. 07/750,039, filed Aug. 27, 1991, now abandoned.

BACKGROUND OF THE INVENTION

1. Field of the Invention

This invention relates to a paper web threading apparatus for use in a rotary printing press as a paper web handling machine.

2. Description of the Prior Art

In paper web handling machines, many paper web threading apparatuses in which a paper web is threaded substantially along a web threading path through a paper web threading member movably arranged substantially in parallel with the paper web threading path are disclosed, for example, in Japanese Laid-Open Utility Model Publication No. SHO 62-925, Japanese Laid-open Patent Application No. SHO 61-167553, Japanese Laid-open utility Model Application No. SHO 63-163939 and No. HEI 2-29727, and Japanese Laid-open Patent Application No. HEI 2-86249, etc.

Each of the paper web threading apparatuses disclosed in the aforementioned publication is adapted for use in a rotary printing press, and constructed such that, in the rotary printing press including a paper web driving device comprised of a slitter for slitting a paper web in the longitudinal direction thereof into web strips and a drag roller for sending forwards the divided web strips towards the downstream side of a paper web threading path, the paper web is threaded through the intermediary of the paper web threading members substantially along the paper web threading path extending from a paper web supply station to the paper web dividing device, and then each of the divided paper webs obtained by the action of the dividing device is further threaded through the relevant paper web threading members substantially along the relevant paper web threading path leading to the following station.

Further, the paper web threading apparatus disclosed in Japanese Laid-open Patent Application No. SHO 61-167553 comprises, in addition to the above-mentioned configuration, a means for detecting slack of each of divided paper web strips on the downstream side of the paper web dividing device, the slack detector means each being connected with a driving means for each paper web threading member, the arrangement being made such that when the slack detector means detects any slack the operating speed of the driving means of the corresponding paper web threading member is increased to eliminate slack of the divided paper webs.

In the above-mentioned paper web threading apparatuses, the paper web threading members adapted to thread a paper web and each of divided web strips substantially along their respective paper web threading paths are driven by their respective driving means separate from a driving system of a rotary printing press which is a paper web handling machine.

Further, the divided web strips are threaded along their individual web threading paths, and the length, the number and degree of directional changes (or flexures) of the paths are different, and therefore there is a difference in loading to which the paper web threading numbers are subjected from the mechanism supporting them when they are moved substantially along their respective web threading paths.

Still further, transmission of the driving force by the driving means to the paper web threading members resorts to the frictional force exerted between the peripheral surface of rotating member of the driving means and the outer surface of the paper web threading member. This frictional force varies with changes in physical properties of the peripheral surface of the rotating member and the outer surface of the paper web threading members with the lapse of time and/or due to use thereof. Further, the frictional force also varies with other factors such as, for example, adhesion of extraneous matters to the peripheral surface of the rotating member and the surface of the paper web threading members. Therefore, it is rarely the case that the frictional forces exerted between the peripheral surfaces of the rotating members of the driving means and the surfaces of the paper web threading members in the respective web threading paths become equal in magnitude.

As a result of combination of the above-mentioned factors, when a paper web and each of divided paper webs are threaded by their respective paper web threading members along the relevant paper web threading paths, respectively, a variable difference occurs between the operating speed of the paper web handling machine when each of the paper webs is threaded along its path (or the paper web delivery speed of the web handling machine to the downstream side when each of the paper webs is threaded along its path) and the speed of movement of each of the paper web threading members. Further, a variable difference occurs also between the speeds of movement of the paper web threading members which serve to thread divided web strips along their relevant paths.

Yet further, in comparison of the length of the actual paper web threading path with the path along which the paper web threading member is moved, at a place where the adjusting roller is disposed and the length of the paper web threading path is variable, the length of the path along which the paper web threading member is moved is longer than the maximum length of the paper web threading path which is variable, so that the length of the path along which the paper web threading member is moved is slightly longer than that of the actual paper web threading path.

Consequently, the paper web and each of the divided paper webs to be threaded substantially along their respective web threaded paths slacken more than the amount required with the result that the paper web and the divided paper webs tend to shift to the left or to the right relative to the direction of threading of paper webs, interfere with the mechanism adjacent to the relevant paper web threading path or hang down to a large extent, or the leading portion and the trailing portion of each of the paper web and the divided paper webs tend to interfere with each other, and as a result, each of the paper webs being folded partially, thus causing unbalance in tension exerted on the paper web and the divided paper webs, respectively, resulting in tear of the paper webs.

Further, the paper web threading apparatus disclosed in Japanese Laid-open Patent Application No. SHO 61-167553 comprises a means for detecting slack of divided paper webs for concentrating the slack to one place and restraining it below a predetermined amount, and a means for increasing the speed of movement of the paper web threading member to eliminate the detected slack. However, the arrangement for concentrating such slack to one place tends to impair the working environment due to air blow, that is, it causes suspension of dust such as paper scraps, etc. and generation of noise, thus giving operators physical and/or mental pain. On the other hand, arrangements for concentrating slack of paper webs to one place by means of a common roller type web tensioner require provision of a comparatively large space for installing the roller type web tensioner in the web threading path. However, at places in the vicinity of the paper web dividing device or near the adjusting rollers where each of divided paper webs is liable to slacken to a comparatively large degree, guide rollers and turning bars are normally concentrated, thereby rendering it difficult to provide the space for installing the web tensioner.

SUMMARY OF THE INVENTION

The present invention has been made in view of the above-mentioned circumstances, and has its object to adjust the speed of movement of each of paper web threading members for a paper web and divided paper webs to keep it in a predetermined relationship with the operating speed of a web handling machine (that is, the paper web delivery speed of the paper web handling machine to the downstream side of the path), or keep it approximately equal to or slightly faster or somewhat faster only for an appropriate period of time than the operating speed when the paper web and the divided paper webs are threaded by their respective paper web threading members substantially along their respective web threading paths, thereby minimizing to the utmost or eliminating slack of the paper web and the divided paper webs to be threaded to prevent the occurrence of troubles such as tear of the paper webs during the threading operation. Another object of the present invention is to provide a paper web threading apparatus constructed in such a manner that it does not impair the working environment and also does not require provision of a large space for installing a web tensioner along the paper web threading path.

To achieve the above-mentioned objects, according to a first aspect of the present invention, there is provided a paper web threading apparatus for use in a paper web handling machine comprising: a paper web threading member disposed movably substantially along a paper web threading path; a driving means for moving the paper web threading member; a first signal generator means for outputting a signal in response to the movement of the paper web threading member; a processor means for receiving the signal outputted by the first signal generator means as an input thereof, processing the signal so as to obtain a processed value relating to the speed of movement of the paper web threading member, and comparing the processed value with a reference value preset in connection with the operating speed of the paper web handling machine when the paper web is threaded along its paper web threading path, and then outputting an adjusting signal depending on the result of comparison; and an adjusting means for receiving the adjusting signal outputted by the processor means as an input thereof and adjusting the driving means so as to vary the speed of movement of the paper web threading member.

According to a second aspect of the present invention, there is provided a paper web threading apparatus for use in a paper web handling machine arranged so as to slit a paper web in the longitudinal direction thereof on the way of its paper web threading path comprising: paper web threading members each disposed movably substantially along a paper web threading path for each of the divided paper webs; driving means each provided for moving each of the paper web threading members; first signal generator means each provided for outputting a signal in response to the movement of each of the paper web threading members; processor means for receiving the signal outputted by each of the first signal generator means as an input thereof, processing the signals so as to obtain processed values each relating to the speed of movement of each of the paper web threading members, and comparing each of the processed values with a reference value preset in connection with the operating speed of the paper web handling machine when each of the paper webs is threaded along its relevant path, and then outputting an adjusting signal depending on the result of comparison; and adjusting means each provided for receiving each of the adjusting signals outputted by the processor means as an input thereof and adjusting the corresponding driving means so as to vary the speed of movement of the corresponding paper web threading member.

Further, according to a third aspect of the present invention, there is provided a paper web threading apparatus for use in a paper web handling machine as set forth in the first and second aspects, further comprising: a detector means for detecting the arrival of a paper web which is threaded along a place where the difference between the length of the paper web threading path and that of the path along which the paper web threading member is moved is more than a predetermined value, and then outputting a signal, the processor means being arranged to receive the signal outputted by the detector means as an input thereof, and then output an adjusting signal to vary the speed of movement of the paper web threading member only for a predetermined period of time.

Still further, according to a fourth aspect of the present invention, there is provided a paper web threading member for use in a paper web handling machine as set forth in the first to third aspects, further comprising: a second signal generator means for outputting a signal in response to the operation of the paper web handling machine, the processor means being arranged to receive the signal outputted by the second signal generator means as an input thereof, process the signal so as to obtain a processed value relating to the operating speed of the paper web handling machine, and set the processed value as a reference value.

Yet further, according to a fifth aspect of the present invention, there is provided a paper web threading apparatus for use in a paper web handling machine as set forth in the first to fourth aspects, further comprising: an alarming means, said processor means being arranged to receive the signal outputted by the first signal generator means as an input thereof, process the signal so as to obtain a processed value relating to the speed of movement of the paper web threading member, and compare the processed value with a reference value preset in connection with the operating speed of the paper web handling machine when the paper web is threaded along the path, and then depending on the result of comparison output either an adjusting signal or an alarming signal to actuate the alarming means.

According to the above-mentioned configuration, a paper web is driven by the driving means so as to be threaded substantially along a paper web threading path extending from the paper web supply station to the final handling station. In case the paper web is divided in the longitudinal direction thereof into two web strips on the way from the paper web supply station to the final handling station, each of the divided paper webs is threaded by its paper web threading member along its paper web threading path leading to the final handling station.

During the threading of the web strips through their respective paths, each of the first signal generator means outputs a signal in response to the movement of each of the web strip threading members, and the output signal is inputted to the processor means.

The processor means functions to process the signal outputted by each of the first signal generator means and which is received thereby so as to obtain processed values each relating to the speed of movement of each of the paper web threading members, and compare each of the processed values with a reference value preset in connection with the operating speed of the paper web handling machine when each of the paper webs is threaded along the path (or the paper web delivery speed of the paper web handling machine to the downstream side when each of the paper webs is threaded along the path), and then depending on the result of comparison output and adjusting signal to the adjusting means for adjusting the operational speed of the relevant driving means.

The above-mentioned reference value is decided in connection with the operating speed of the web handling machine; that is, the paper web delivery speed of the paper web handling machine to the downstream side when the paper web is threaded along the path. Stating more specifically, either a value obtained by computation or a value obtained empirically is previously stored in the processor means, or any one of the above-mentioned value is set by inputting it to the processor means each time, or alternatively a signal outputted by the second signal generator means in response to the operation of the web handling machine is inputted to the processor means, and then the input signal is processed by the processor means so as to obtain a processed value relating to the operating speed of the web handling machine, which is set as the reference value.

The adjusting means which has received the adjustment signal outputted by the processor means will adjust the operating speed of the driving means so as to adjust the speed of movement of the paper web threading member. This adjustment is made such that the processed value is kept in a predetermined relationship with the reference value, that is to say, the result of comparison between the processed value and the reference value maintains a predetermined relationship preset to the processor means. Stating more concretely, this adjustment is made such that the speed of movement of the paper web threading member becomes nearly equal to or slightly faster than the paper web delivery speed of the paper web handling machine to the downstream side, or alternatively the speed of movement of the paper web threading member becomes slightly faster than the paper web delivery speed of the web handling machine only for an appropriate time, for example, after the arrival of the paper web which is threaded along the path is detected by the detector means.

Further, in case at least one of the results of comparison between the processed values and the reference value which is made by the processor means is out of the range which is recoverable and adjustable by adjustment of the driving means by means of the adjusting means, the processor means will output an alarming signal in place of an adjusting signal, thereby informing it by means of the alarming means to the operator.

According to the present invention, when each of the paper web and the divided paper webs is threaded by its paper web threading member along its paper web threading path, the speed of movement of each of the paper web threading members is adjusted such that it is kept in a predetermined relationship with the operating speed of the paper web handling machine, that is, the paper web delivery speed of the paper web handling machine to the downstream side when the paper web is threaded along its path. Stating more concretely, the speed of movement of each of the paper web threading members is adjusted such that it becomes nearly equal to or slightly faster than the paper web delivery speed of the paper web handling machine to the downstream side when the paper web is threaded along the relevant path, or alternatively it becomes slightly faster than the paper web delivery speed of the web handling machine only for an appropriate time so that slack of the paper web and the devided paper webs can be minimized to the utmost or eliminated. Consequently, troubles such as shifting of the paper web and the divided paper webs to be threaded to the left or to the right relative to the direction of threading thereof, interference of the webs with mechanism adjacent to the web threading paths, having down of the webs, interference of the leading portion and the trailing portion of each of the paper web and the divided paper webs, etc. can be eliminated, so that the possibility of tear of paper webs during the threading operation can be eliminated thereby improving the operational efficiency.

Further, since there is no need to provide a wide space for installation of the apparatus of the present invention, and also working environment is not impaired by carrying out the present invention, operators are not given mental and/or physical pain, thus contributing to security of labor hygiene.

The above-mentioned and other objects, aspects and advantages of the present invention will become apparent to those skilled in the art by making reference to the following description and the accompanying drawings in which a preferred embodiment incorporating the principles of the present invention are shown by way of example only.

DETAILED DESCRIPTION OF THE PREFERRED EMBODIMENT

The present invention will now be described hereinbelow by way of an example only with reference to the accompanying drawings.

Figure 1:
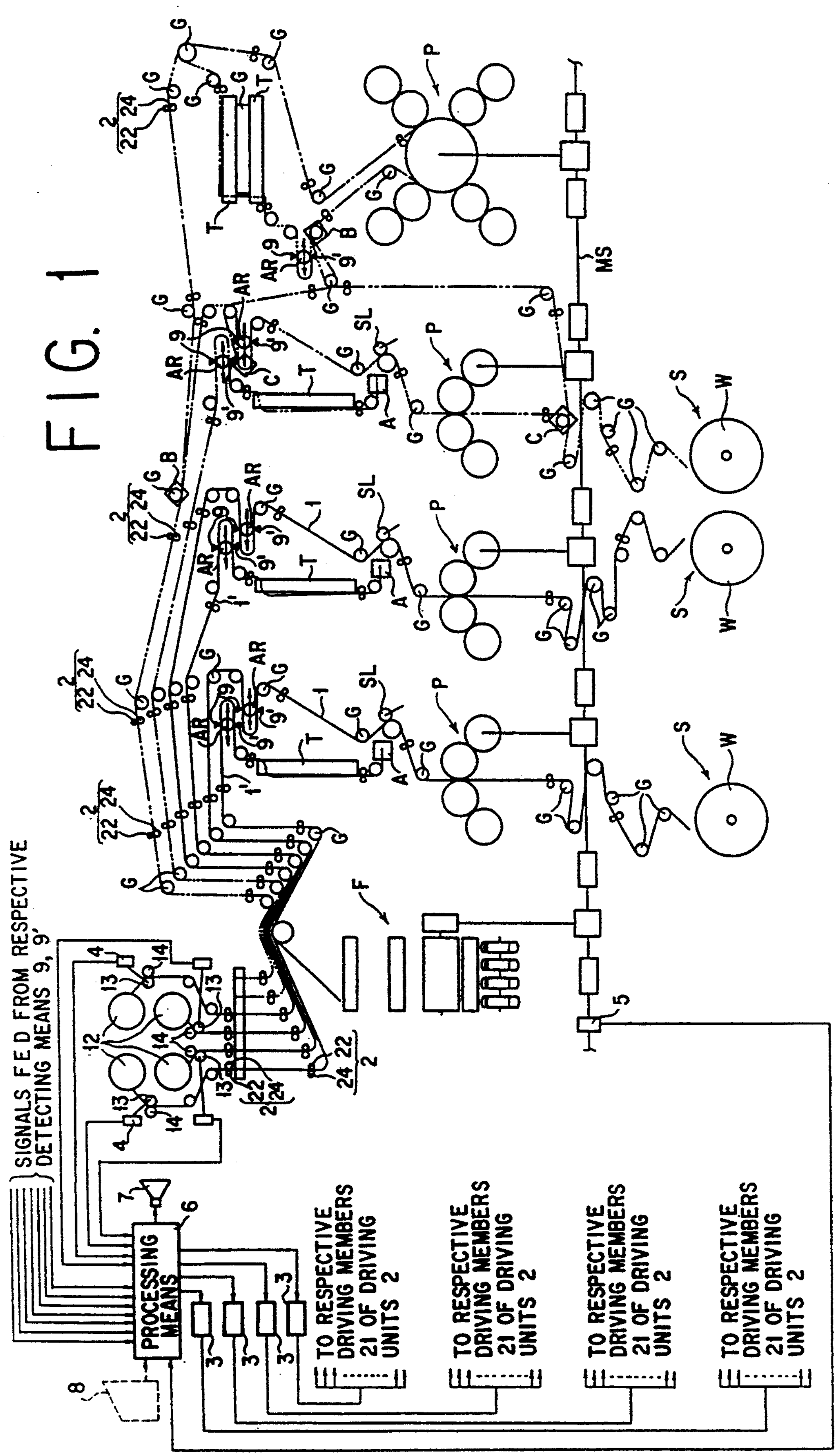
FIG. 1 is a schematic overall configurational view showing one embodiment of the rotary printing press to which the present invention is applied.

FIG. 1 shows schematically one embodiment of the rotary printing press which is a paper web handling machine. This rotary printing press includes one or a plurality of paper web supply station(s) S, printing station(s) P and folding station(s) F, which are associated in cooperation with one another. The paper web threading path is routed by a plurality of guide rollers GR and turning bars TB, etc., and is branched on its way so as to provide predetermined paper web threading paths each extending from the paper web supply station S through the printing station P to the folding station F.

Figure 2:
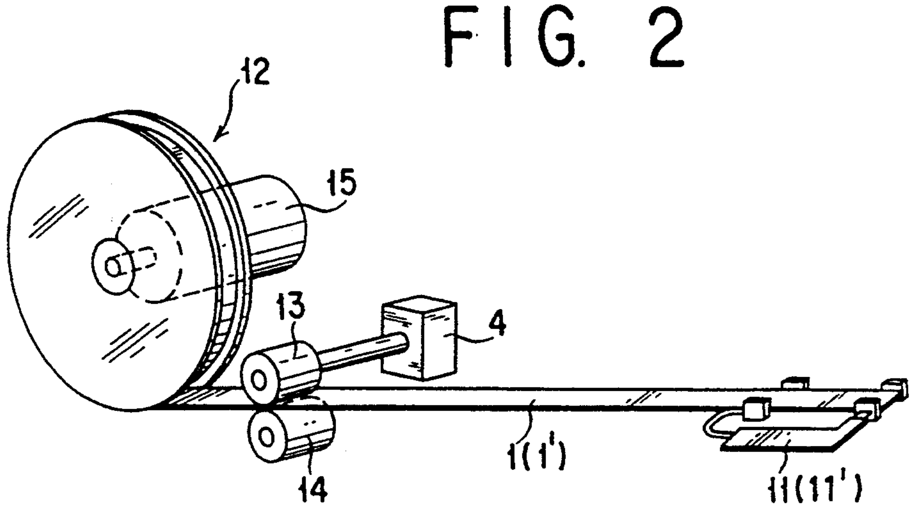
FIG. 2 is a schematic perspective view showing one embodiment of the paper web threading member.

The paper web threading apparatus according to the present invention for use in such a rotary printing press is useful for drawing out a paper web from a paper web take-up reel W installed at each paper web supply section S, and threading the paper web substantially along a predetermined paper web threading path extending from the paper web supply station S through the printing station P to the folding station F for obtaining desired printed matters. The concrete configuration of the paper web threading apparatus is as shown in FIGS. 1 to 3.

Stating more specifically, paper web threading members 1 and 1′ are arranged such that they may be moved under the guidance of proper guide members (not shown) from each of the paper web supply stations S to each of the folding stations P on one side of each of paper web threading paths routed by a plurality of guide rollers G, adjusting rollers AR which serve as guide rollers capable of adjusting the length of the paper web threading paths and turning bars T, etc., and along the inside of a frame FR (see FIG. 3), or from a position where the paper web on the way of the paper web threading path is slit in the longitudinal direction thereof, such as for example, a place downstream of the position where a slitter SL is actuated to each of the folding stations F. Each of the guide members is provided at its appropriate position with a driving means 2 for moving the paper web threading members 1 and 1′ by holding and rotating them.

The paper web threading member 1 (1′) is a continuous strip-shaped member which is bendable in accordance with the flexure of the above-mentioned guide. The paper web threading member 1 (1′). The paper web threading member 1 (1′) has a paper web retaining member 11′ at one end thereof, and is connected at the other end thereof with each of paper web threading member pooling sections 12 provided in the vicinity of the folding station F.

Figure 3:
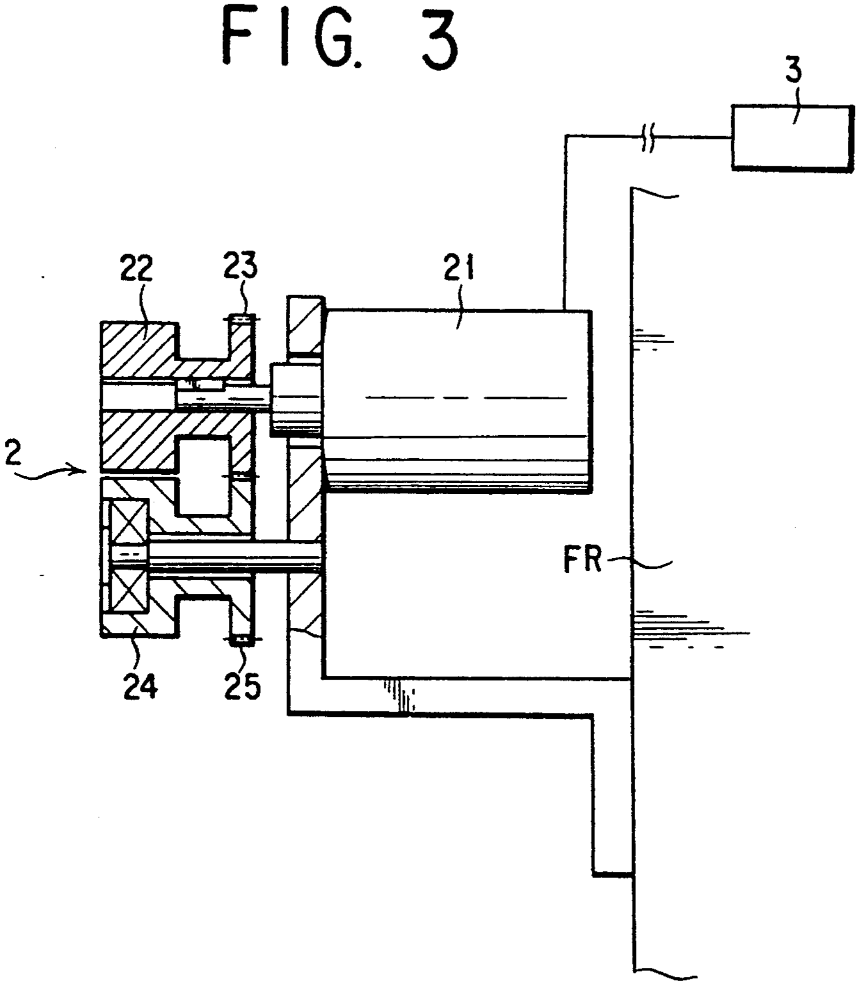
FIG. 3 is a fragmentary sectional view showing one embodiment of the driving means for moving the paper web threading member.

The driving means 2 is constructed as shown in FIG. 3, for example, and comprises a driving member 21, a driving roller 22 fixedly secured to an output shaft of the driving member 21 and whose peripheral surface is made of an elastomer such as rubber, a driving gear 23 formed as an integral unit of the driving roller 22, an auxiliary roller 24 provided so as to rotate freely at a position where the above-mentioned paper web threading member 1 (1′) is held between the driving roller 22 and the roller 24, and a driven gear 25 formed integrally with the auxiliary roller 24 and which is engaged with the driving gear 23. The driving member 21 is connected with an adjusting means 3 for adjusting the rotational speed thereof such as, for example, an inverter. Further, it is sufficient to provide one or more of the driving means 2 to move one paper web threading member 1 (1′), that is to say, the number of the driving means 2 should be decided taking into consideration the load to which the paper web threading member 1 (1′) is subjected during movement thereof.

Further, on the downstream side of a position where the paper web is slit in the longitudinal direction thereof, that is to say, where the above-mentioned slitter SL is actuated, there is provided an appropriate automatic retaining means A adapted to secure by adhesivebonding the free end of the other one of the two portions of the paper web divided by the slitter SL onto the paper web retaining member 11′ of another paper web threading member which stands by on the downstream side of the paper web threading path.

Provided at a position in the vicinity of the above-mentioned paper web threading member pooling section 12 are a pair of rollers 13 and 14 which are brought into pressure contact with the paper web threading member 1 (1′) and rotated freely according as movement of the latter. Out of the pair of rollers 13, 14, for example, the roller 13 is provided with a first signal generator means 4 adapted to output a signal in response to the rotation thereof, whilst a main driving shaft MS for driving the rotary printing press is provided with a second signal generator means 5 adapted to output a signal in response to the rotation of the main driving shaft MS or the operation of the rotary printing press. The first signal generator means 4 is a rotary encoder adapted to output a pulse signal in response, for example, to the rotation of the roller 13, whilst the second signal generator means 5 is a rotary encoder adapted to output a pulse signal in response to, for example, the rotation of the main driving shaft MS.

Further, there is provided a processor means 6 which is connected with the first signal generator means 4, the second signal generator means 5 and the abovementioned adjusting means 3. Further, an alarming means 7 is connected with the processor means 6. In addition thereto, in case a large difference occurs between the length of the actual paper web threading path and that of the path along which the paper web threading member 1 (1′) is moved, as in the case of the path along which the paper web threading member 1 (1′) is moved relative to the adjusting rollers AR, detector means 9 and 9′ are provided at starting and terminal points of the deviation of the actual paper web threading path from the path along which the paper web threading member 1 (1′) is moved. The detector means 9 and 9′ are connected with the processor means 6. In the embodiment shown in FIG. 1, the detector means 9 and 9′ are provided so as to detect the arrival of the paper web to be threaded along the path by detecting the paper web retaining member 11 of the paper web threading member 1 (1′) in interlocking relationship with the adjusting rollers AR. It is of course possible to detect the arrival of the paper web to be threaded along the path by detecting the leading end of the paper web.

The operation of the paper web threading apparatus arranged as mentioned hereinabove will now be described below.

In the first place, the driving member 21 of the driving means 2 is reversely rotated so as to draw out the paper web threading member 1 (1′) by the driving roller 22 and the auxiliary roller 24 from the paper web threading member pooling section 12, and move it towards a place downstream of the paper web supply stations S where the paper web take-up reel W is installed and also downstream of the position where the paper web is slit in the longitudinal direction thereof (that is; where the slitter SL is actuated). Then, the paper web threading member 1 (1') is stopped when the paper web retaining member 11 attached to one end of the paper web threading member 1 (1') is reversely run to a predetermined stand-by position, i.e., in the condition as shown in FIG. 1. Further, each of two-dot chain lines indicated in FIG. 1 shows a path along which the paper web threading member 1 (1') is moved towards a place downstream of the paper web supply station S and also downstream of the position where the slitter SL is actuated when the paper web threading member pooling section 12 is moved to the right in FIG. 1 and the driving member 21 of the driving means 2 is reversely run again as mentioned above after completion of threading the paper web by the paper web threading member 1 (1') as shown in solid lines. At a branched portion B of the path, the branching means is switched over to select a predetermined paper web threading path before the arrival of the paper web threading member 1 (1'). Reference character c in FIG. 1 shows a joining portion of the sub threading paths.

Subsequently, the paper web retaining member 11 of the paper web threading member 1 which has been reversely run to the position where the paper web is waiting in the paper web supply station S is secured to the leading end of the paper web drawn out from the paper web take-up reel W.

This paper web securing operation is made either manually or automatically using an adhesive-bonding means (not shown). Upon completion of the securing operation, the paper web threading apparatus is ready for threading of the paper web, and then the paper web threading is begun.

Upon completion of the above-mentioned preparation, threading of the paper web along the path is conducted by inching or rotating the rotary printing press at a speed slightly faster than the inching first of all, and then rotating forwardly the driving member 21 of the driving means 2 and moving the paper web threading member 1 by the driving roller 22 and the auxiliary roller 24 substantially along the paper web threading path in the opposite direction to that of the above-mentioned preparatory operation for threading, i.e., towards the paper web threading member pooling section 12. This movement causes the paper web to be drawn out from the paper web take-up reel W and run by way of the above-mentioned guide rollers G, etc. to the folding station F. Further, during the operation of threading the paper web along the path, the paper web threading member pooling section 12 is rotatively driven by a torque motor 15, for example, and serves to rewind and pool the paper web threading member 1 which is moved by the driving roller 22 and the auxiliary roller 24 towards the paper web threading member pooling section 12.

Whilst, in case it is desired to slit a paper web in the longitudinal direction thereof when it is on the way of the paper web threading path and then thread the divided paper webs substantially along their respective paths, the above-mentioned slitter SL is rendered operative at its actuating position to slit the paper web in the longitudinal direction thereof and one of the divided paper webs, namely, the paper web which is secured to the paper web retaining member 11 of the paper web threading member 1 at the paper web supply station S is continuously threaded through the path as it is, whilst the free end of the another one of the divided paper webs is secured by the action of the above-mentioned automatic retaining means A onto a paper web retaining member 11 of another paper web threading member 1' which is waiting on the downstream side of the slitter actuating position. After that, the other paper web threading member 1' which is waiting at the above-mentioned downstream position is moved substantially along the paper web threading path to conduct threading of a paper web in the same manner as in the case of threading the paper web from the above-mentioned paper web supply station through its path.

In the above-mentioned paper web threading operation, each of the first signal generator means 4 functions to output a pulse signal in response to the rotation of the roller 13 which is rotated by movement of each of the paper web threading member 1 (1') and input it to the processor means 6. Further, the second signal generator means 5 functions to output a pulse signal in response to the rotation of the main driving shaft MS, i.e., the operation of the rotary printing press and input it to the processor means 6.

The processor means 6 functions to count and process pulse signals outputted by each of the first signal generator means 4 and the second signal generator means 5 and which are inputted thereto for a fixed period of time, and conduct relational operation of the counted/processed value of the pulse signal outputted by each of the first signal generator means 4 using the counted/processed value of the pulse signal outputted by the second signal generator means 5 as a reference value. As a result of each relational operation, if any of the counted/processed values of the pulse signals outputted by the first signal generator means 4, for example, deviates from a preset relationship or a predetermined allowable range which is a few percent larger than the above-mentioned reference value, then the processor means 6 will output an adjusting signal to the adjusting means 3 adapted to adjust the operational speed of the driving member 21 of the driving means 2 which is moving the paper web threading member 1 (1') corresponding to the first signal generator means 4 that is outputting the relevant pulse signal so as to vary the moving speed of the paper web threading member 1 (1').

Each of adjusting means 3 which have received the adjusting signal as an input thereof will adjust the operating speed (i.e., rotational speed) of the driving member 21 of each of the relevant driving means 2 in response to the adjusting signal so as to eliminate the result of computation or operation which deviates from the aforementioned predetermined relationship.

If the processor means 6 receives as an input a detection signal indicative of the arrival of the paper web outputted by the detector means 9 and 9' when they detect the paper web retaining member 11 of the paper web threading member 1 (1'), then the processor means 6 will output an adjusting signal to increase the rotating speed of the driving member 21 of each of the driving means 2 which is moving the paper web threading member 1 (1'), for a proper period of time. Stating more concretely, the processor means 6 functions as follows, for example.

The processor means 6 functions to measure the period of time from the time when it receives the detection signal outputted by the detector means 9 as an input thereof to the time when it receives the detection signal outputted by the detector means 9' as an input thereof, and also upon receipt of the detection signal outputted by the detector means 9' output an adjusting signal to the relevant adjusting means 3 so as to allow the driving member 21 of each driving means 2 to be operated at an operating speed which is, for example, 1.1 to 2.0 times higher than that of the rotary printing press at that time only for the same periods of time as the above-mentioned measured time period. The adjusting means 3 which has received the adjusting signal as an input thereof will adjust the operating speed (or rotating speed) of the driving member(s) 21 of the relevant driving means 2 in response to the adjusting signal.

Owing to the above-mentioned operation, the operating speed of the rotary printing press and the moving speed of each of the paper web threading members 1 (1') can be maintained in an approximately fixed relationship, and in case the paper web and each of divided paper webs to be threaded along the path slacken largely, such slack is removed on all such occasions. Accordingly, slack of the paper web and each of divided paper webs to be threaded along the path can be minimized to the utmost or eliminated.

Further, in case, as a result of the aforementioned relational operation made by the processor means 6, the result of operation of any of the first signal generator means 4 is out of the range which is adjustable by the corresponding or relevant adjusting means 3, the processor means 6 will output an alarming signal to actuate the alarming means 7, thereby informing the operator of it. At that time, the operation of the rotary printing press and the driving means 2 may be stopped simultaneously with the actuation of the alarming means 7.

Further, in the above-mentioned configuration, as a substitute for the second signal generator means 5, an input means 8 (shown by broken line in FIG. 1) may be connected with the processor means 6, and a value obtained empirically or a value obtained by computation may be set by inputting it to the processor means 6 as the reference value to be compared with counted/processed values of the pulse signals outputted by the first signal generator means 4, or alternatively the above-mentioned value obtained empirically or by computation may be stored previously in the processor means 6 in place of inputting the value to the processor means 6 each time.

The present invention is not to be limited to the configuration of the embodiment explained hereinabove, and for example, an arrangement wherein each of the paper web threading members is disposed in endless manner along each of the paper web threading paths may be used, and in case the driving means has a speed change gear, a mechanism for operating the speed change gear may be used as the adjusting means. Further, each of the paper web threading members may be provided with a regular through-hole, protrusion or cavity, or alternatively, a distinguishable marking, and also the first signal generator means may be used as a detector for detecting the above-mentioned marking and outputting a detection signal. Still further, tachogenerators may be used as the first and second signal generator means so that the electromotive forces induced by them may be compared by means of the processor means.

It is intended in any event that the paper web threading apparatus according to the present invention covers all changes and modifications in design thereof which do not depart from the scope of claims.

It is to be understood that the foregoing description is merely illustrative of a preferred embodiment of the present invention, and that the scope of the present invention is not to be limited thereto, but is to be determined by the scope of the appended claims.

What is claimed is:

1. A paper web threading apparatus for use in a paper web handling machine arranged so as to slit a paper web in the longitudinal direction thereof by a slitter on the way of its paper web threading path, comprising:

paper web threading members each disposed for traveling by carrying a paper web substantially along a paper web threading path for each of a plurality of divided paper webs;

driving means each provided for driving each of the paper web threading members for traveling so as to have each of the paper web threading members travel;

a first signal generator means associated with a paper threading member for monitoring traveling speed of said paper web threading member and for outputting a signal indicative of the absolute travelling speed of said paper web threading member;

processing means for receiving the signal outputted by each of the first signal generator means as an input thereof, deriving processed values each corresponding to the traveling speed of each of the paper web threading members, and comparing each of the processed values with a reference value preset in connection with the operating speed of the paper web handling machine when each of the paper web is threaded along its relevant path, and outputting an adjusting signal depending upon a result of comparison; and adjusting means each provided for receiving each of the adjusting signals outputted by the processing means as an input thereof and controlling the corresponding driving means for adjusting the traveling speed of the corresponding paper web threading member so as to reduce the result of comparison to zero.

2. A paper web threading apparatus for use in a paper web handling machine, comprising:

a paper web threading member disposed for traveling while carrying the paper web substantially along a paper web threading path;

a driving means for driving the paper web threading member so as to have the paper web threading member travel;

a first signal generator means associated with said paper web threading member for outputting a signal indicative of the absolute traveling speed of said paper web threading member;

a processing means for receiving the signal outputted by the first signal generator means as an input thereof, processing the signal deriving a processed value corresponding to the traveling speed of the paper web threading member, comparing the processed value with a reference value preset in connection with the operating speed of the paper web handling machine when the paper web is threaded along its paper web threading path, and outputting an adjusting signal depending upon a difference between said processed value and said reference value; and an adjusting means for receiving the adjusting signal outputted by the processing means as an input thereof and controlling the driving means for adjusting the traveling speed of the paper web threading member so as to reduce said difference to zero.

3. A paper web threading apparatus for use in a paper web handling machine according to claim 2, characterized by further comprising:

a detector means for detecting the arrival of a paper web which is threaded along a place where the difference between the length of the paper web threading path and that of the path along which the paper web threading member is moved is more than a predetermined value, and then outputting a signal, said processor means being arranged to receive the signal outputted by the detector means as an input thereof, and then output an adjusting signal to vary the speed of movement of the paper web threading member only for a predetermined period of time.

4. A paper web threading apparatus for use in a paper web handling machine according to claim 2, by further comprising:

a second signal generator means for outputting a signal in response to the operation of the paper web handling machine, said processor means being arranged to receive the signal outputted by the second signal generator means as an input thereof, process the signal so as to obtain a processed value relating to the operating speed of the paper web handling machine, and set the processed value as a reference value.

5. A paper web threading apparatus for use in a paper web handling machine according to one of claims 2 to 4, by further comprising:

an alarming means, said processor means being arranged to receive the signal outputted by the first signal generator means as an input thereof, process the signal so as to obtain a processed value relating to the speed of movement of the paper web threading member, and compare the processed value with a reference value preset in connection with the operating speed of the paper web handling machine when the paper web is threaded along the path, and then depending on the result of comparison output either an adjusting signal or an alarming signal to actuate the alarming means.

6. A paper web threading apparatus for use in a paper web handling machine operating at a known operation speed, comprising:

a paper web threading member detachably carrying a paper web through a predetermined paper web threading path across said paper web handling machine;

a variable speed driving means associated with said paper web threading member for driving the latter at a controlled traveling speed;

a traveling speed monitoring means associated with said paper web threading member for generating a traveling speed indicative signal having a frequency representative of the traveling speed of said paper web threading member;

a control signal generator means for deriving a traveling speed of said paper web threading member on the basis of said traveling speed indicative signal and driving a control signal for controlling said variable speed driving means in order to adjust the traveling speed of said paper web threading member toward a target speed determined in relation to said known operation speed of said paper web handling machine.

7. A paper web threading apparatus for use in a paper web handling machine operating at a known operation speed, comprising:

a paper web threading member detachably carrying a paper web through a predetermined paper web threading path across said paper web handling machine;

a variable speed driving means associated with said paper web threading member for driving the latter at a controlled traveling speed;

a traveling speed monitoring means associated with said paper web threading member for generating a periodic signal having a frequency corresponding to the traveling speed of said paper web threading member;

a control signal generator means for deriving a traveling speed of said paper web threading member on the basis of said periodic signal and deriving a control signal for controlling said variable speed driving means in order to adjust the traveling speed of said paper web threading member toward a target speed determined in relation to said known operation speed of said paper web handling machine.

8. A paper web threading apparatus for use in a paper web handling machine comprising:

a paper web threading member detachably carrying a paper web through a predetermined paper web threading path across said paper web handling machine;

a variable speed driving means associated with said paper web threading member for driving the latter at a controlled traveling speed;

a traveling speed monitoring means associated with said paper web threading member for generating a first periodic signal having a frequency corresponding to the traveling speed of said paper web threading member;

an operation speed monitoring means associated with said paper web handling apparatus for generating a second periodic signal having a frequency corresponding to the operation speed of said paper web handling apparatus;

a control signal generator means for deriving the traveling speed of said paper web threading member on the basis of said periodic signal and the operation speed of said paper web handling apparatus, and deriving a control signal for controlling said variable speed driving means in order to adjust the traveling speed of said paper web threading member toward a target speed determined in relation to said operation speed of said paper web handling machine.

9. A paper web threading apparatus for use in a paper web handling machine, comprising:

a paper web threading member disposed for traveling while carrying the paper web substantially along a paper web threading path;

a driving means for driving the paper web threading member so as to have the paper web threading member travel;

a first signal generator means associated with said paper web threading member for generating a periodic signal having a frequency corresponding to the traveling speed of said paper web threading member;

a processing means for receiving the signal outputted by the first signal generator means as an input thereof, processing the signal deriving a processed value corresponding to the traveling speed of the paper web threading member, comparing the processed value with a reference value preset in connection with the operating speed of the paper web handling machine when the paper web is threaded along its paper web threading path, and outputting an adjusting signal depending upon a difference between said processed value and said reference value; and an adjusting means for receiving the adjusting signal outputted by the processing means as an input thereof and controlling the driving means for adjusting the traveling speed of the paper web threading member so as to reduce said difference to zero.

* * * * *